(12) United States Patent
Krell et al.

(10) Patent No.: US 9,286,631 B2
(45) Date of Patent: *Mar. 15, 2016

(54) IDENTITY VERIFICATION AND DATA MANAGEMENT SYSTEM

(71) Applicant: BEERDROPPER, LLC, Wilmington, DE (US)

(72) Inventors: Jeremy N. Krell, Chicago, IL (US); Gregory Goodman, Southampton, MA (US)

(73) Assignee: BEERDROPPER, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,611

(22) Filed: Aug. 5, 2014

(65) Prior Publication Data

US 2015/0186962 A1 Jul. 2, 2015

Related U.S. Application Data

(63) Continuation of application No. 13/290,351, filed on Nov. 7, 2011, now Pat. No. 8,794,515.

(51) Int. Cl.
| | |
|---|---|
| *G06K 5/00* | (2006.01) |
| *G06Q 30/06* | (2012.01) |
| *G06Q 20/32* | (2012.01) |
| *G06Q 20/40* | (2012.01) |
| *H04N 1/00* | (2006.01) |
| *H04N 5/232* | (2006.01) |
| *G06K 7/14* | (2006.01) |
| *G07G 1/00* | (2006.01) |

(52) U.S. Cl.
CPC .............. *G06Q 30/0607* (2013.01); *G06K 5/00* (2013.01); *G06Q 20/32* (2013.01); *G06Q 20/40* (2013.01); *G06Q 20/4014* (2013.01); *G06Q 30/0609* (2013.01); *H04N 1/00334* (2013.01); *H04N 5/23229* (2013.01); *G06K 7/14* (2013.01); *G06Q 30/06* (2013.01); *G07G 1/0045* (2013.01)

(58) Field of Classification Search
CPC ....... G06K 5/00; G06K 7/14; G06Q 20/4014; G07G 1/0045
See application file for complete search history.

(56) References Cited

U.S. PATENT DOCUMENTS

| | | |
|---|---|---|
| 5,864,623 A | 1/1999 | Messina et al. |
| 6,463,416 B1 | 10/2002 | Messina |
| 6,465,416 B2 | 10/2002 | Verstrat et al. |
| 6,523,741 B1 | 2/2003 | DiMaria et al. |
| 6,920,437 B2 | 7/2005 | Messina |
| 6,947,571 B1 | 9/2005 | Rhoads et al. |
| 7,478,067 B2 | 1/2009 | Messina |
| 7,708,189 B1 | 5/2010 | Cipriano |
| 7,860,318 B2 | 12/2010 | Mandelbaum et al. |
| 7,899,751 B2 | 3/2011 | Messina |
| 8,139,869 B2 | 3/2012 | Mandelbaum et al. |
| 8,322,605 B2 | 12/2012 | Ludlow et al. |
| 8,392,975 B1 | 3/2013 | Raghunath |
| 8,794,515 B2 | 8/2014 | Krell et al. |
| 2003/0018897 A1* | 1/2003 | Bellis et al. ................... 713/182 |

(Continued)

*Primary Examiner* — Thien M Le
*Assistant Examiner* — Claude J Brown
(74) *Attorney, Agent, or Firm* — Lando & Anastasi, LLP (57) ABSTRACT

A system for management of age verification using an internet enabled mobile device. The system provides ID verification using identification information comparison. The system further optionally provides display of completed and pending orders, routing to delivery destination, and prioritizing of deliveries.

20 Claims, 5 Drawing Sheets

(56) References Cited

U.S. PATENT DOCUMENTS

| | | | |
|---|---|---|---|
| 2004/0049401 A1* | 3/2004 | Carr et al. | 705/1 |
| 2004/0068441 A1 | 4/2004 | Werbitt | |
| 2004/0078578 A1* | 4/2004 | Khandelwal et al. | 713/185 |
| 2004/0158724 A1* | 8/2004 | Carr et al. | 713/186 |
| 2006/0095369 A1* | 5/2006 | Hofi | 705/39 |
| 2007/0086638 A1* | 4/2007 | Ackley et al. | 382/132 |
| 2007/0138260 A1 | 6/2007 | Keys | |
| 2008/0296370 A1 | 12/2008 | Khandelwal et al. | |
| 2009/0316950 A1 | 12/2009 | Alasia et al. | |
| 2011/0173041 A1 | 7/2011 | Breitenbach et al. | |
| 2012/0024948 A1 | 2/2012 | Messina | |
| 2012/0163676 A1 | 6/2012 | Mandelbaum et al. | |
| 2013/0072280 A1* | 3/2013 | Yacenda | 463/17 |
| 2013/0117283 A1 | 5/2013 | Ludlow et al. | |
| 2013/0173484 A1* | 7/2013 | Wesby | 705/318 |

* cited by examiner

IDENTITY VERIFICATION AND DATA MANAGEMENT SYSTEM

RELATED APPLICATIONS

This application is a continuation of and claims priority under 35 U.S.C. §120 to U.S. application Ser. No. 13/290,351 entitled "ALCOHOL DELIVERY MANAGEMENT SYSTEM," filed on Nov. 7, 2011, which application is incorporated by reference in its entirety.

BACKGROUND OF THE INVENTION

1. Field of the Invention

The present invention relates generally to an age verification system employing an internet enabled mobile device. More particularly, the present invention relates to an age verification system that utilizes an internet enabled mobile device to verify an identity and age of a purchaser.

2. Description of Related Art

Every year, thousands of college students get behind the wheel intoxicated. Sadly many of these drivers may be injured or may injure others, and some may drive to their deaths. For many of them, the reason they decided to engage in this reckless behavior is for the "beer run". A college party requisite, the beer run is the tradition of replenishing the libations for any social event. Such activities result in hardworking, fun loving students not getting alcohol in a safe, controlled way. Further, in 2012 alone, the U.S. Department of education projects that over 19 million students will enroll in institutes of higher education. Four years later, they will be seniors in college, and ready to enjoy alcohol as a part of their social lives.

Moreover, underage drinking at college campuses is a rampant problem, leading to poor decisions, injuries—both physical and mental—decreased academic performance, and even death.

Further still the fraudulent usage of fake identification causes a major problem at bars, clubs, casinos and other venues where admission and service is limited to of-age individuals.

Therefore, what is needed is a system that may quickly and reliably verify identity. Further, this system must securely and effectively prevent under-age people from receiving alcoholic beverages. Further still, what is needed is a system that may provide alcoholic beverages to adults of drinking age without requiring these adults to drive when intoxicated.

SUMMARY OF THE INVENTION

The subject matter of this application may involve, in some cases, interrelated products, alternative solutions to a particular problem, and/or a plurality of different uses of a single system or article.

In one aspect, age verification system is provided. The system comprises an internet enabled mobile device having a camera, the camera configured to capture and store a digital image of a computer readable barcode printed on a driver's license. The barcode comprises a quantity of barcode information which further comprises identification information. The system further comprises a decoding module in electronic communication with the internet enabled mobile device, the decoding module configured to decode the barcode information of the barcode from the digital image.

In one embodiment, the system may comprise a comparison module in electronic communication with the internet enabled mobile device, the comparison module is configured to compare the quantity of barcode information to a quantity of data allowing age verification. The quantity of data allowing age verification may be data such as a critical date for reaching a certain age, or may be identification information provided by a potential customer, the comparison module is capable of determining if the barcode information and the data allowing age verification match.

In another aspect, a method of age verification utilizing an internet enabled mobile device is provided. The method comprises the steps of capturing an image of a barcode of a driver's license using a digital camera, the driver's license belonging to a potential customer, storing the image using a memory of the internet enabled mobile device, processing the image using a decoding module the processing of the image comprising identifying a quantity of identification information stored in the barcode, comparing, using a comparison module, the quantity of identification information stored in the barcode with a second quantity of identification information, and providing a feedback based on the results of the comparison.

In yet another aspect, a system for managing alcoholic beverage delivery utilizing an internet enabled mobile device is provided. The system comprises the steps of receiving an order for an alcoholic beverage, receiving a quantity of identification information provided by a potential customer, delivering the order, capturing an image of a barcode of a driver's license belonging to the potential customer using a digital camera of the internet enabled mobile device, processing the image using a decoding module to identify a quantity of identification information stored in the barcode, comparing the quantity of identification information stored in the barcode with the quantity of identification information provided by the potential customer using a comparison module in electronic communication with the internet enabled mobile device, and providing a feedback based on the results of the processing.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an age verification system utilizing an internet enabled mobile device. The system may be designed to be utilized by any user desiring to verify and identify a person's age. The system may, among other things, perform identity verification utilizing a state issued driver's license. In further embodiment, the system may also track pending and completed orders, provide delivery routing, assign appropriate orders to a deliverer, and determine automatically the appropriate deliverer.

The age verification system may utilize an internet enabled mobile device as an interface for data input and output. Internet enabled mobile devices may include, among others, internet enabled cellular phones, including "smart phones" such as iPhone®, Blackberry®, or Android® OS devices, tablet devices, iPod Touch®, personal digital assistants (PDAs) and similar portable, handheld devices.

The system may provide identity and/or age verification utilizing the internet enabled mobile device. In one embodiment, a camera of the mobile device may be utilized to capture a picture of a barcode of a driver's license and store the picture as an image file. In one embodiment, the age may be verified by confirming that the age is greater than a predetermined minimum age (21 for example in the case of alcohol purchase). In another embodiment, this barcode may be decoded and the identity verified by comparison of barcode information with information provided by the purchaser. In a further embodiment, the barcode of the license may be in a PDF417 format.

In one embodiment, to verify the information on the barcode, as an additional layer of security, a purchaser may provide a quantity of identification information to be compared to the information stored on the barcode. In one embodiment, the identification information may be provided by the purchaser at the time of placing the order by, for example, providing said information on a website, over the phone or verbally. In another embodiment, the identification information may be provided by the purchaser at the time and place of delivery, if the system is employed for an age-restricted product delivery service. In yet another embodiment, the identification information may be provided by the potential customer at the time of entering an age-limited establishment. In still another embodiment, a repeat purchaser may choose to store a quantity of identification information on a server accessible by the mobile device. In yet another embodiment, the information provided by the potential customer may be information provided to a state driver licensing agency which may be accessible by the internet enabled mobile device.

The barcode may be decoded using a decoding module which may be in electronic communication with the internet enabled mobile device. The decoding module may decode the barcode in any fashion that may allow a computer to store and utilize the information contained in the barcode.

The system may further comprise a comparison module to compare the decoded barcode information to a quantity age verification data. In one embodiment, this data may be a critical date, which will be the latest birth date of a person to be a certain age on a certain date. For example, the critical date for a person to be 21 years old is today's date, minus 21 years. In another embodiment, the data may additionally be a quantity of identification information provided by the purchaser along with a critical date—this embodiment may provide an added layer of security. The comparison module may be in electronic communication with the internet enabled mobile device. The comparison module may compare the information, and provide a signal via said electronic communication to the internet enabled mobile device that the age is verified as age appropriate, or denied as under-age.

In one embodiment, a server-side process may be employed. In this embodiment, the image file storing the picture of the barcode may be sent electronically by the mobile device to a remote server which may act as the decoding module. The server-based decoding module may then decode the barcode into a quantity of identification information. Once decoded, the comparison module may compare the decoded information to the age verification data. In this embodiment, the comparison module may be located at the remote server. If the decoded information indicates age appropriateness, the server may send an electronic signal to the mobile device to provide a first feedback confirming identity and instructing the deliverer to complete the transaction. Alternatively, if the decoded information shows that the age is not age-appropriate, the server may send a signal to the mobile device to provide a second feedback indicating an identity verification failure.

In another embodiment, a server-side process may be employed. In this embodiment, the image file storing the picture of the barcode may be sent electronically by the mobile device to a remote server which may act as the decoding module. The server-based decoding module may then decode the barcode into a quantity of identification information. The decoded information may be sent electronically to the mobile device for comparison by the comparison module. In this embodiment, the mobile device may comprise the comparison module. In one embodiment, the comparison module may be physically integrated with the mobile device. The comparison module of the mobile device may compare the decoded information. If the decoded information identifies age appropriateness, the mobile device may provide a first feedback. Alternatively, if the decoded information does not identify age appropriateness, the mobile device may provide a second feedback signaling an identity verification failure.

In still another embodiment, the decoding module and comparison module may be physically integrated with the mobile device. The mobile device may comprise the decoding module which may decode the barcode as described above. In this embodiment, the mobile device may comprise the comparison module. The decoded barcode information may then be compared, using the comparison module of the mobile device. If the decoded barcode information identifies age appropriateness mobile device may provide a first feedback verifying identity. Alternatively, if the barcode information does not identify age appropriateness, the mobile device may provide a second feedback signaling an identity verification failure.

In yet another embodiment, the decoding module may be physically integrated with the mobile device while the comparison module may be located at the remote server. The mobile device, which comprises the decoding module, may decode the barcode image, and then send this decoded information to a server. The server may have access to the age verification data, such as the critical date and/or the quantity of identification information provided by the purchaser. In this embodiment, the comparison module of the server may compare the decoded information with the age verification data. If the decoded information identifies age appropriateness, the server may send a signal to the mobile device to provide a first feedback verifying identity. Alternatively, if the decoded information does not identify age appropriateness, the server may send a signal to the mobile device to provide a second feedback signaling an identity verification failure.

In a further embodiment, a camera of the mobile device may be used to take a picture of a front of a driver's license of a purchaser, wherein the front of the driver's license may comprise a quantity of human-readable identification information. In this embodiment, a second decoding module in electronic communication with the internet enabled mobile device may employ optical character recognition (OCR) to extract a quantity of information. This information may be used as the identification information provided by the purchaser, or may be used as an extra level of security to provide the mobile device or server with three sets of identification information for comparison, namely, the critical date for age verification, the information from the decoded barcode image, and the results from the OCR processing. The second decoding module may be located in the mobile device in one embodiment. In another embodiment, the second decoding module may be positioned on a remote server and the picture of the front of the license may be sent to the remote server for OCR processing.

A second comparison module in electronic communication with the mobile device may compare the decoded OCR information from the license with information gathered from the barcode, and/or the critical date for age verification. The second comparison module may be located either on the mobile device, or on the server.

In a further embodiment, the internet enabled mobile device may be in electronic communication with a law enforcement computer. In this embodiment, in the event of an age verification failure, the internet enables mobile device may send a communication to the law enforcement computer indicating the failure.

In an embodiment where the internet enabled mobile device is used for age restricted product delivery, the mobile device may be configured to track and display one or a plurality of pending orders for a deliverer. Further, it may inform the deliverer of new pending orders. In one embodiment, the mobile device may access the pending orders by accessing a server via the internet. In another embodiment, the mobile device may access the pending orders by having them directly sent to the mobile device from a server that receives orders. Preferably, the pending orders may be displayed on a display of the mobile device via an application interface on the mobile device. The deliverer may utilize the pending orders information for planning, such as to determine his next destination, plan routes, track how much work he has left, and the like.

The pending orders may contain information comprising order information, destination address, identification information for the purchaser, and the like.

The mobile device may further be configured to track and display completed orders for the deliverer. After completing an order, the deliverer may manually mark the order as completed. Alternatively, the order may automatically be marked as completed by the mobile device once the mobile device detects that it has been completed. In one embodiment, the completed order data may be stored on the mobile device. In another embodiment, the completed order data may be stored on a server and remotely accessed by the mobile device over the internet. Preferably, the pending orders may be displayed on a screen of the mobile device via an application interface on the mobile device.

The system may further comprise a routing module in electronic communication with the mobile device. The routing module may be configured to automatically assign orders to a deliverer. The routing module may be incorporated into the mobile device, or may be located on a remote server and in communication with the mobile device. The routing module may utilize information such as the geographic location of the deliverer, amount of orders pending, inventory availability, distance from the deliverer's shop or warehouse, delivery destination, an order's time of placement, specific deliverer preference, and the like.

The routing module may further be configured to determine order delivery deadlines and order delivery priority for a deliverer. In one embodiment, the routing module may determine order delivery deadline and/or priority based on a purchaser's preferred deadline, a maximum time limit based on time of order placement, the deliverer's location and distance from the destination, the deliverer's current pending orders, and if inventory is needed, the deliverer's distance from his shop or warehouse.

The routing module may further be configured to determine, automatically, the best driving route for the deliverer to maximize delivery efficiency, economy, and to limit environmental impact. In one embodiment, the routing module may calculate and optimize the delivery routes. In another embodiment, the mobile device may have a global positioning system (GPS) receiver. The GPS may allow for determination of position, and the routing module may utilize the position of the mobile device to aid in route determination. Examples of routing systems that may be incorporated into the routing module may include Google® Maps, or Garmin® technology.

When completing an order, at for example, a store, delivery site, bar or restaurant, the system may require that the purchaser electronically sign a confirmation using the mobile device. In one embodiment, the purchaser may read an agreement and push a button of the mobile device. In another embodiment, the purchaser may read an agreement and touch a portion of a touch screen of the mobile device. In still another embodiment, the purchaser may touch-draw their signature on a touch screen of the mobile device. In yet another embodiment, the mobile device may include a fingerprint scanner. In this embodiment, a purchaser may scan their fingerprint to confirm the order. The fingerprint scanner may additionally be utilized as an extra layer of identity confirmation, and may be utilized as discussed above.

Figure 1:
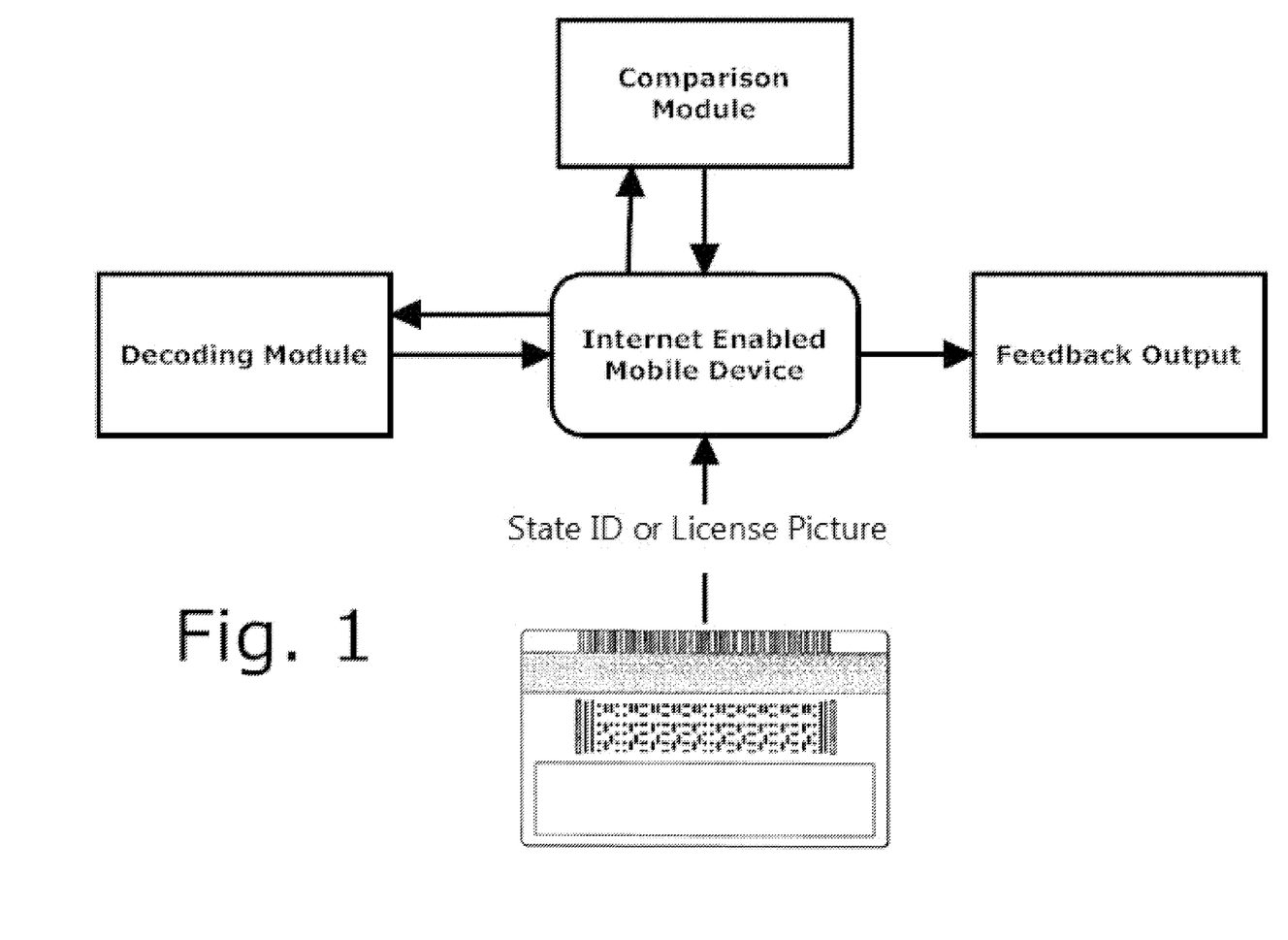
FIG. 1 provides a flow chart showing a configuration of an embodiment of the system.

Turning now to FIG. 1, a flow chart showing a configuration of an embodiment of the system is provided. FIG. 1 shows an internet enabled mobile device, centrally located with arrows pointing to and from it. These arrows indicate a data flow and electronic communication directions. Barcode information from a license is received by the internet enabled mobile device using an input to the device such as a camera. The barcode information is sent to a decoding module which decodes the barcode information into computer-readable identification information. This decoded information is then sent back to the internet enabled mobile device. From there, the decoded data is sent to a comparison module. The comparison module compares the decoded data to a quantity of identification (ID) information provided by a user, or potential customer. These two sets of identification information are compared using the comparison module. The results of the comparison are then sent from the comparison module back to the internet enabled mobile device. Based on the results, the mobile device provides a feedback output. The feedback output may provide a first feedback in the event that the comparison module identifies that the data is a match, or a second feedback in the event that the data does not match. Further, a routing module may be in electronic communication with the internet enabled mobile device. The routing module may provide order updates and current pending orders to the device, which may display the updates and orders on a screen of the device. In addition, the routing module may provide directions to a destination of the deliver, and may prioritize orders based on proximity to the delivery location. It should be noted that the decoding module, comparison module, routing module, and the like may be integrated into the internet enabled mobile device, or may be remotely positioned at a server in communication with the device.

Figure 2:
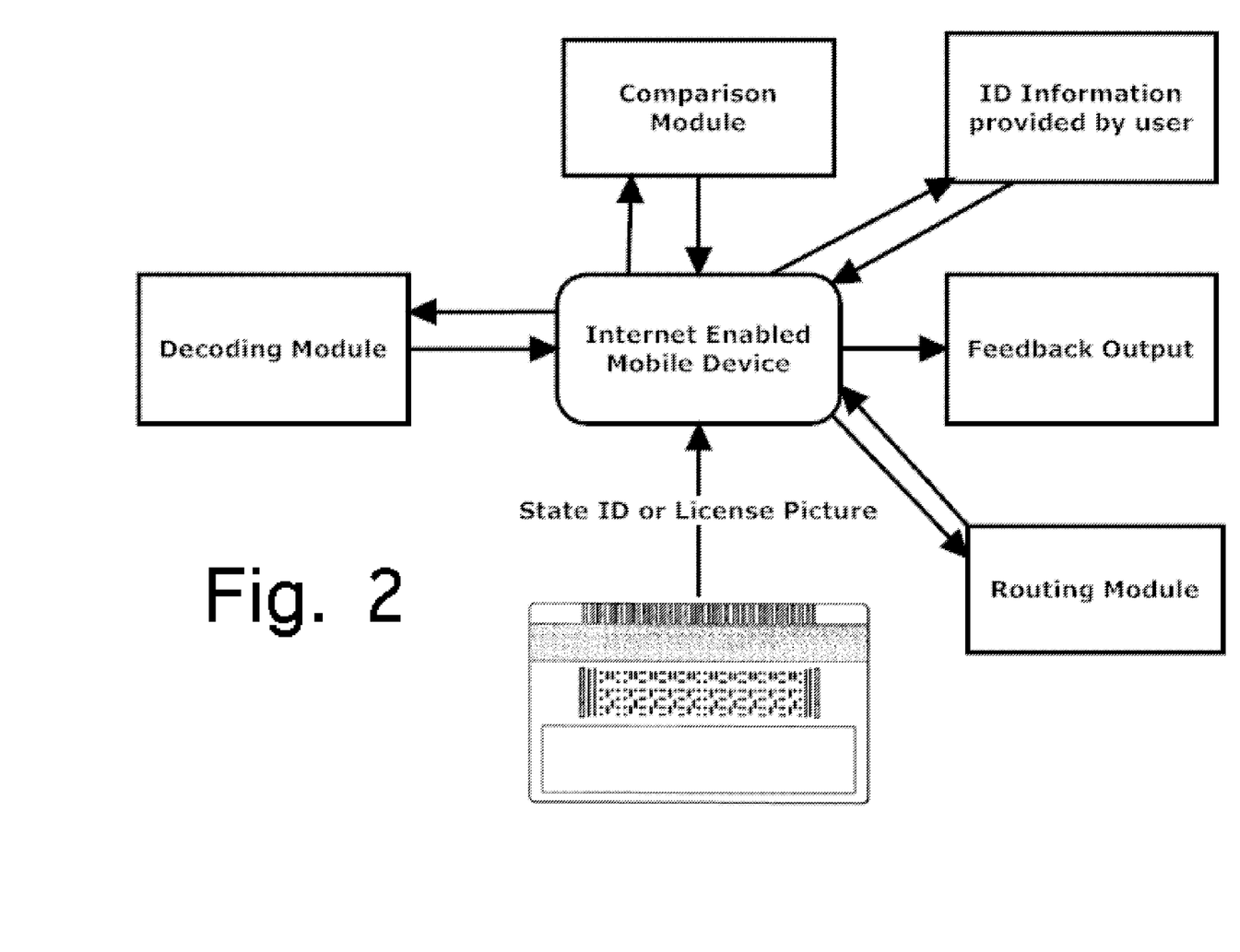
FIG. 2 provides a flow chart of another embodiment of the system.

FIG. 2 shows a flow chart of another embodiment of the system. In this embodiment, identification information from a front of a driver's license is received by the internet enabled mobile device. This information is in the form of alpha-numeric print, and received by the device using a camera. The identification information is sent to a second decoding module, which is connected to the internet enabled mobile device. The second decoding module decodes the alpha-numeric print into a computer-readable format and returns the decoded information to the device. Once decoded, the decoded information is sent to a second comparison module. The second comparison module compares this decoded information either with information decoded from the barcode of a license, information provided by a potential customer, or both. Based on the results from the second comparison module, the mobile device provides a feedback output. The feedback output may provide a first feedback in the event that the comparison module identifies that the data is a match, or a second feedback in the event that the data does not match. It should be noted that the second decoding module, second comparison module, and the like may be integrated into the internet enabled mobile device, or may be remotely positioned at a server in communication with the device.

Figure 3:
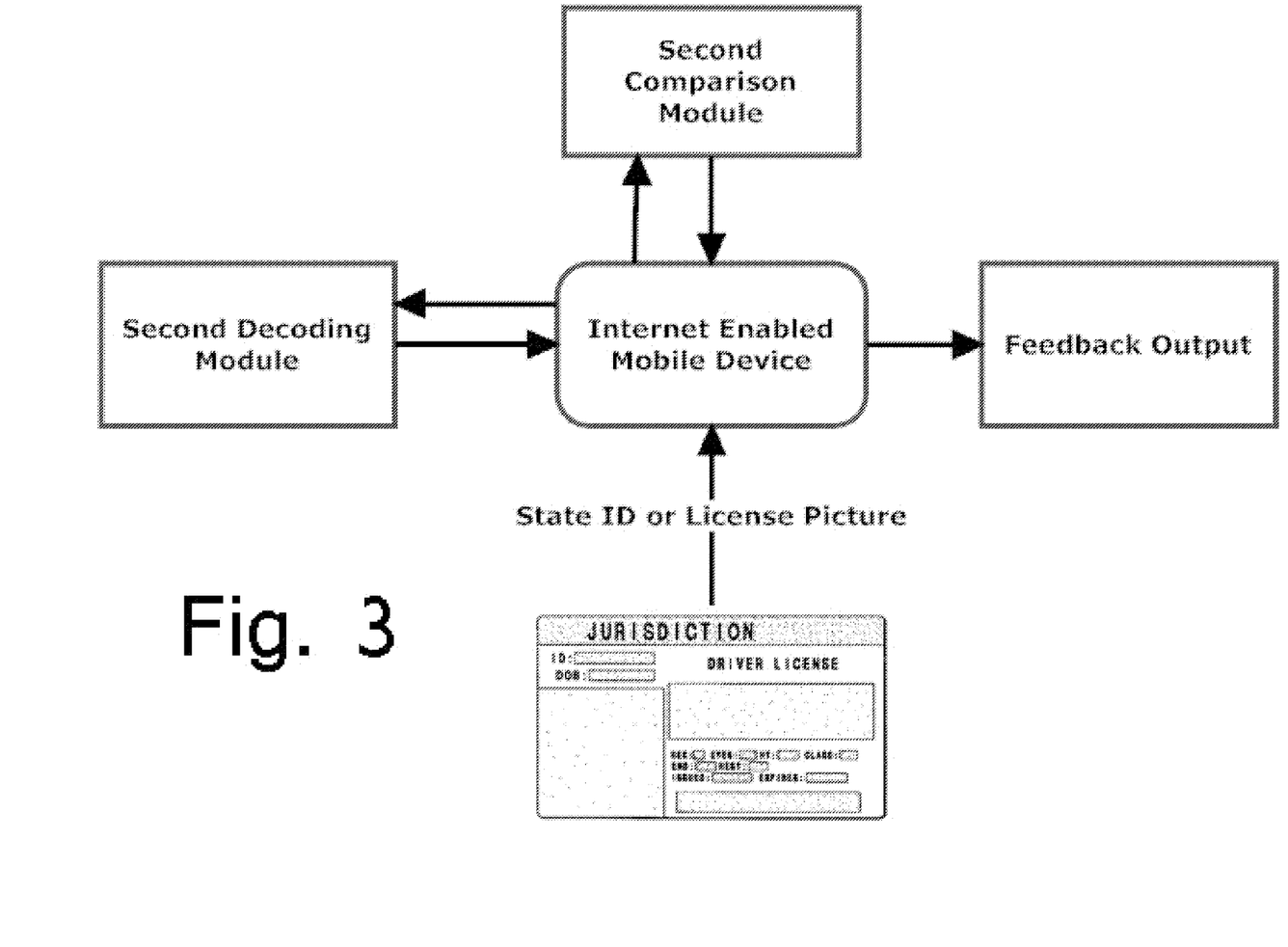
FIG. 3 provides a flow chart of the steps of one embodiment of the system.

FIG. 3 provides a flow chart of one embodiment of the steps carried out in relation to the internet enabled mobile device of the system. The flow chart begins when an alcohol vendor, deliverer or seller seeks to verify the identity of a potential customer. The chart comprises the initial step of capturing a photographic image of a barcode of a driver's license using an internet enabled mobile device. Next, the image is sent to a server in electronic communication with the internet enabled mobile device. A decoding module on the server and in electronic communication with the internet enabled mobile device performs the step of processing the image. This step comprises decoding the information stored in the barcode into a computer-readable format. In the event that this decoding is not successful, a picture may again be taken of the barcode. Once decoded, the information stored in the barcode is compared to information provided by a purchaser using a comparison module. In this embodiment, the comparison module is located on the server and in electronic communication with the internet enabled mobile device. If the information compared is a match, a first feedback is provided to indicate the match, and the transaction may continue. If the information compared does not match, a second feedback is provided to indicate no match, and the transaction is cancelled.

Figure 4:
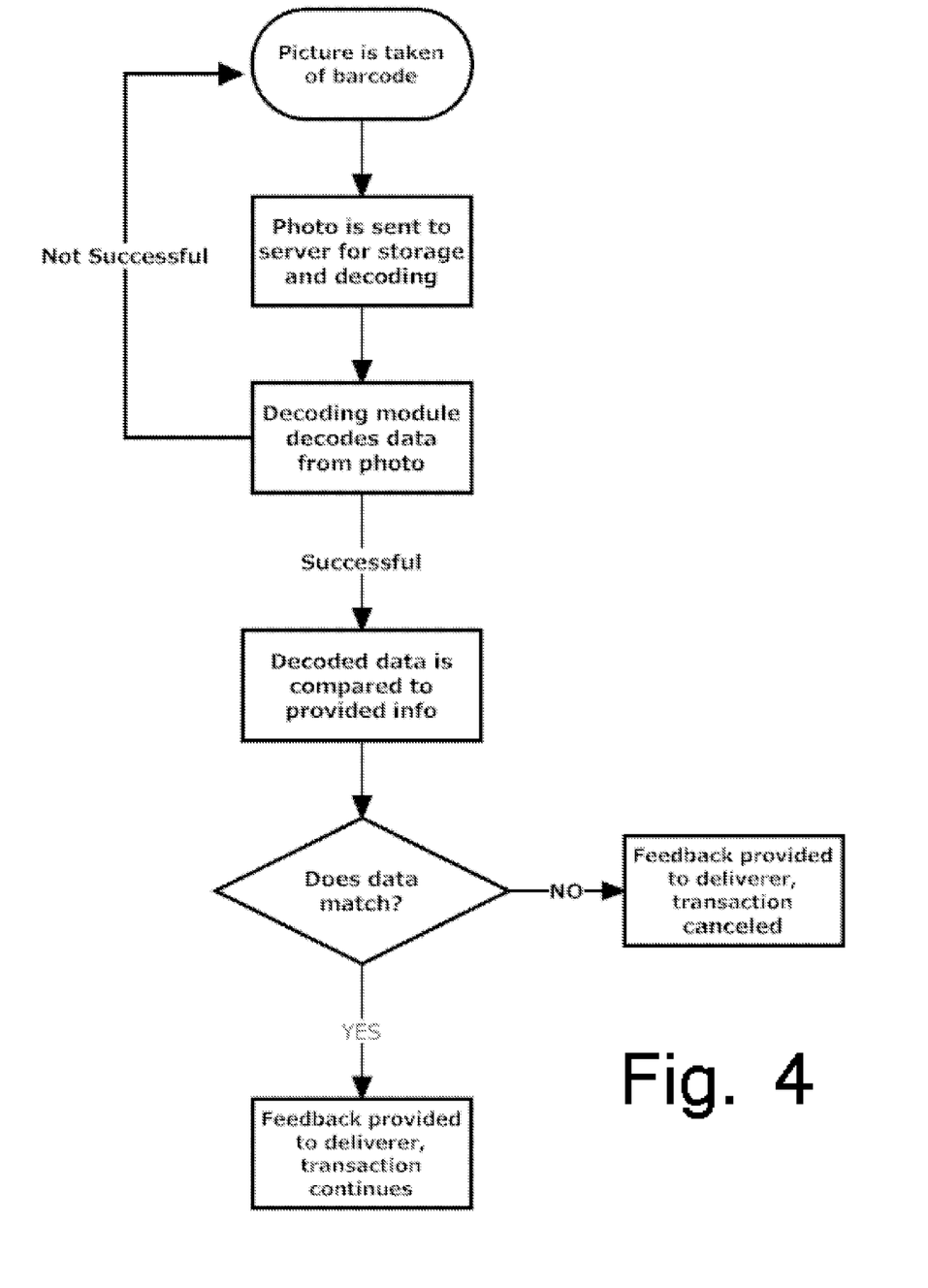
FIG. 4 provides a flow chart of one embodiment of the system for managing alcoholic beverage delivery.
Figure 5:
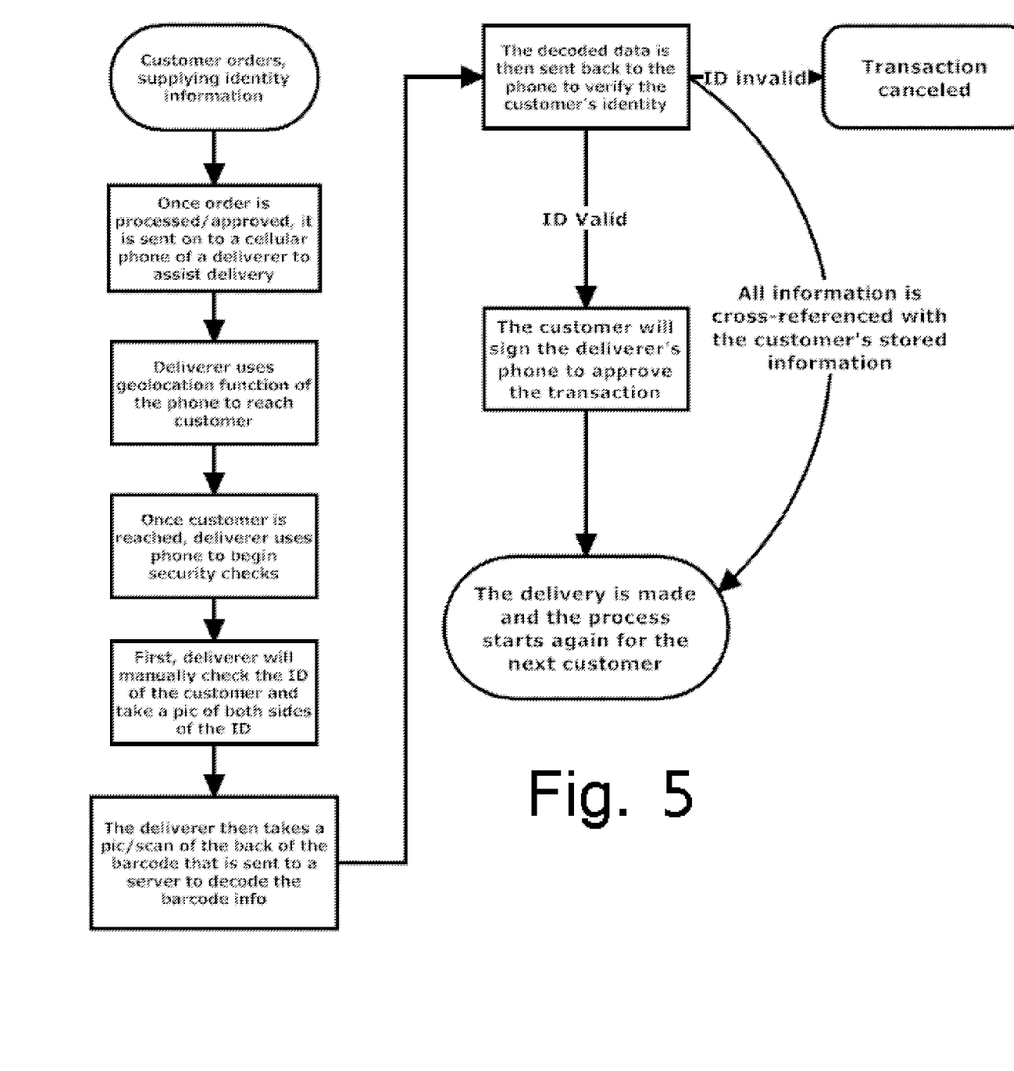
FIG. 5 provides a flow chart of the steps of one embodiment.

FIG. 4 provides a flow chart of one embodiment of the system contemplated herein. The system begins when a customer (i.e. potential customer) orders, and supplies identity information which is then stored. The order is processed, and upon approval of payment, notice is sent to a deliverer's internet enabled mobile device. In this embodiment, the internet enabled mobile device is a cellular phone. The deliverer uses a geolocation/GPS routing function configured as a routing module in electronic communication with the cellular phone to plot a route to the customer, and drives to the customer's location. Once the customer is reached, the deliverer will utilize his cellular phone to begin one or a number of security checks. Initially, the deliverer performs a visual scan of a driver's license identification (ID) of the customer. Next the driver uses a camera of the cellular phone to take a photograph of both sides of the ID. This photograph may be used for recording and confirming the visual check of the ID, as well as for further processing. Next the deliverer uses the camera of the cellular phone to take a picture of a barcode marked on the ID. This picture of the barcode is decoded using a decoding module which, in this embodiment, is located at a server in remote electronic communication with the cellular phone. The decoding module of the server sends the decoded barcode data back to the cellular phone of the deliverer for comparison and cross-referenced with the identity information supplied by the customer. The comparison is performed, in this embodiment, by a comparison module located on the cellular phone. In the event that the comparison indicates that the ID is invalid, the transaction is canceled. In the event that the ID is valid, the customer will sign, using a touch screen of the cellular phone, thereby approving the transaction. After signing, the delivery is made, and the process is repeated for the next customer.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. An identity verification system comprising:
   an internet-enabled mobile device having a camera, the camera configured to capture a digital image of a first source of identity information, including a computer readable barcode associated with a potential customer of a restricted product or service, the barcode comprising identification information associated with the potential customer;
   a decoding module in electronic communication with the internet enabled mobile device, the decoding module configured to decode identity information encoded in the barcode captured in the digital image;
   a comparison module in electronic communication with the internet enabled mobile device, the comparison module configured to:
     compare identity information of the potential customer appearing on a first source of identity information issued by a first authority to identity information encoded in the barcode appearing on the first source of identity information in a first comparison based on the first source;
     determine that the identity information appearing on a first source of identity information is consistent with the encoded information;
     compare, in a second comparison, the identity information of the potential customer with a second source of identity information accessible through a communication network having information unavailable from the first authority;
     validate the identity information of the potential customer with the second source of information, wherein the second source includes at least some different identity information associated with the potential customer than the identity information of the first source of information to validate the identity of the potential customer with the information unavailable from the first authority; and
   wherein the internet enabled mobile device is configured to provide a first feedback to a user in the event satisfying criteria for purchasing the restricted product or service, and a second feedback to a user in the event of a failure to satisfy the criteria.

2. The system of claim 1, wherein the restricted product includes at least age restricted products.

3. The system of claim 2, wherein the comparison module is configured to validate identity of the potential purchaser and approve or deny an alcohol purchase responsive to validation of the identity of the purchaser.

4. The system of claim 1, wherein system is configured to manage the purchase of the restricted product or service executed at a point of sale or at identity verification, the point of sale including one or more of a bar, a restaurant, a retail location, or a delivery location.

5. The system of claim 1, further comprising a storage component for tracking information on orders.

6. The system of claim 5, wherein the information on pending and completed orders includes any one or more of inventory information, delivery information, identity information, time of order, delivery preference, amount of order, purchase location, or delivery location.

7. The system of claim 5, wherein the comparison module is further configured to validate identity information using tracked information.

8. The system of claim 1, wherein the decoding module or comparison module is physically integrated with the internet enabled mobile device.

9. The system of claim 1, wherein the camera is configured to capture and store a quantity of alpha-numeric identification information from a state issue ID;
the system further comprising a second decoding module in electronic communication with the internet enabled mobile device, the second decoding module configured to decode the alpha-numeric identification information into a format readable by a computer; and
a second comparison module in electronic communication with the internet enabled mobile device, the second comparison module capable of automatically comparing the decoded quantity of alpha-numeric identification information with the barcode information.

10. A method of verifying identity for restricted product or service purchase utilizing an internet enabled mobile device, the method comprising:
capturing, from a first source of identity information issued by a first authority, an image of a barcode associated with a potential customer using a digital camera of the internet enabled mobile device;
storing the image using a memory of the internet enabled mobile device; decoding the image using a decoding module, the decoding module in electronic communication with the internet enabled mobile device, the decoding of the image comprising identifying at least some identity information stored in the barcode;
comparing, using a comparison module, in a first comparison the at least some identity information stored in the barcode with identity information of the potential customer based on information from the first source issued by the first authority;
determining, by the comparison module, that the compared identity information from the first source is consistent;
comparing, using the comparison module, in another comparison the identity information of the potential customer with a second source comprising a second external source of identity information accessible through a communication network having information unavailable from the first authority;
validating the identity information with the second source based on the second comparison, wherein the second source includes at least some different identity information associated with the potential customer unavailable from the first authority; and
providing a first feedback by the internet enabled mobile device to indicate when the identity information of the first comparison and the second comparison is valid.

11. The method of claim 10, wherein the restricted product includes at least age restricted products.

12. The method of claim 11, further comprising validating, by the comparison module, the identity of the potential purchaser and approve or deny an alcohol purchase responsive to validation of the identity of the purchaser.

13. The method of claim 11, further comprising managing the purchase of the restricted product or service executed at a point of sale or at identity verification, the point of sale including one or more of a bar, a restaurant, a retail location, or a delivery location.

14. The method of claim 11, further comprising tracking information on orders.

15. The method of claim 14, wherein tracking the information on pending and completed orders includes tracking any one or more of inventory information, identity information, delivery information, time of order, delivery preference, amount of order, purchase location, or delivery location.

16. The method of claim 14, wherein the act of validating identity information includes an act of validating identity information using the tracked information.

17. The method of claim 10, wherein the internet enabled mobile device communicates identity information to an internal decoding module or comparison module to validate the identity of the potential customer.

18. The method of claim 10, wherein the method further comprises:
capturing and storing, by the camera, a quantity of alpha-numeric identification information from a state issue ID;
decoding, by a second decoding module, the alpha-numeric identification information into a format readable by a computer;
comparing automatically, by a second comparison module, the decoded quantity of alpha-numeric identification information with the barcode information with identity information from the first or the second source.

19. The method of claim 10, wherein the step of decoding the image using a decoding module is performed by the decoding module located at a remote server, the remote server being in electronic communication with the internet enabled mobile device.

20. The method of claim 10, further comprising one or more of the steps of:
receiving an order for an alcoholic beverage;
receiving a delivery address for the order;
receiving the second quantity of identification information provided by the potential customer; or
delivering an order for an alcoholic beverage.

* * * * *